Feb. 21, 1967    R. W. BULLARD    3,304,833
THREE DIMENSIONAL DISPLAY
Filed Aug. 30, 1965    2 Sheets-Sheet 1
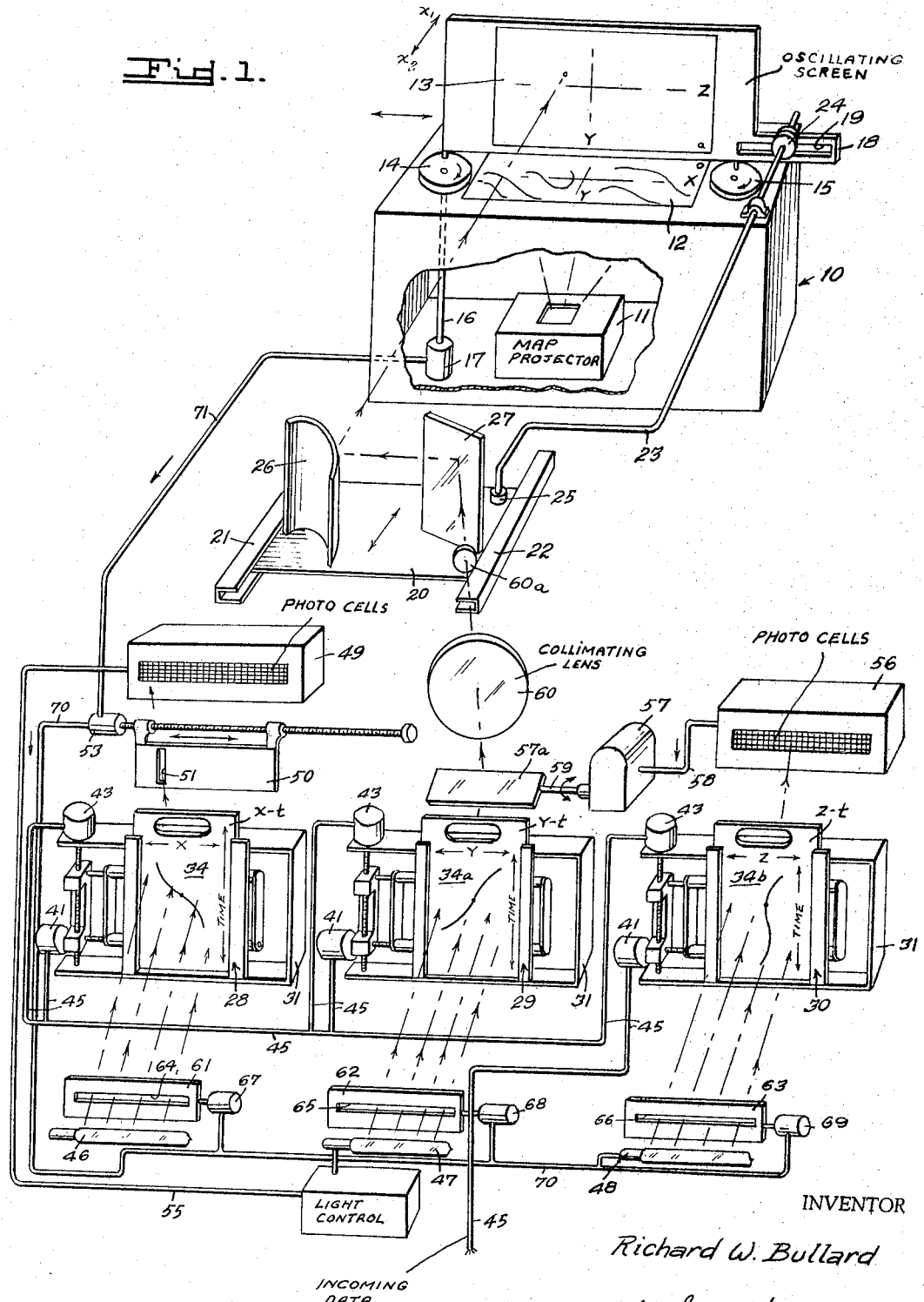
INVENTOR
Richard W. Bullard
BY: Harry M. Saragovitz,
Edward J. Kelly &
A. J. Dupont
ATTORNEYS.

Feb. 21, 1967 R. W. BULLARD 3,304,833
THREE DIMENSIONAL DISPLAY
Filed Aug. 30, 1965 2 Sheets-Sheet 2
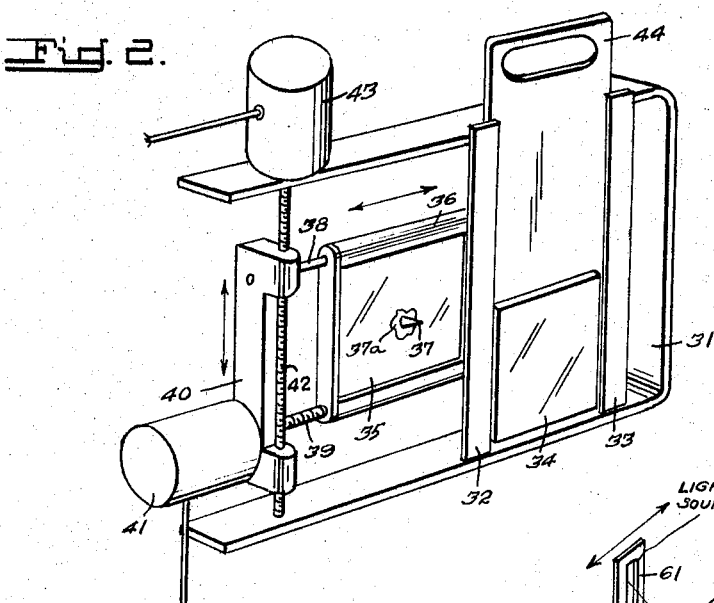
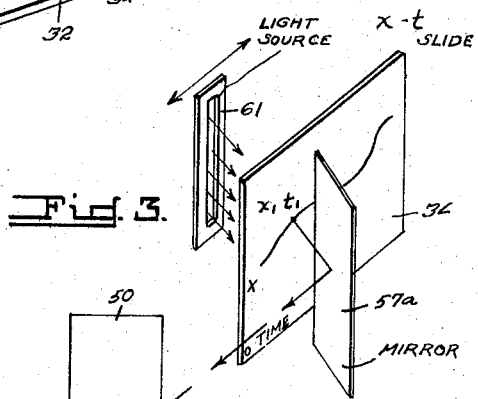
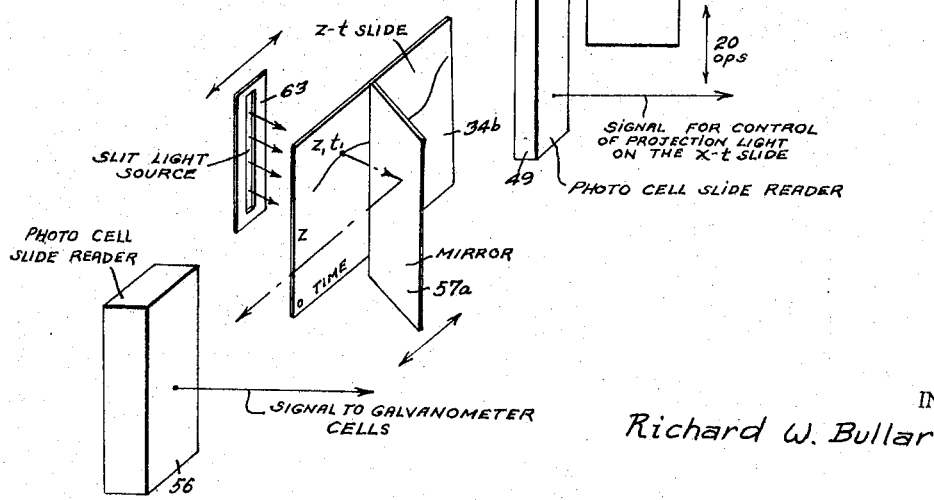
INVENTOR
Richard W. Bullard
BY: Harry M. Saragovitz,
Edward J. Kelly &
A. J. Dupont
ATTORNEYS.

United States Patent Office 3,304,833
Patented Feb. 21, 1967

3,304,833
THREE DIMENSIONAL DISPLAY
Richard W. Bullard, Las Cruces, N. Mex., assignor to the United States of America as represented by the Secretary of the Army
Filed Aug. 30, 1965, Ser. No. 483,888
8 Claims. (Cl. 88—24)

The invention described herein may be manufactured and used by or for the Government for governmental purposes, without the payment to me of any royalty thereon.

This invention relates to a three dimensional display and more particularly to a method and apparatus for the visual presentation of a spot or a line in space onto a screen.

The spot may represent a missile in flight, an aircraft, etc.

Three dimensional displays are valuable in that they give the viewer a more realistic picture than any other type of display and further result in more information conveyed and absorbed. Three dimensional displays have untouched potentialities such as, aircraft guidance enroute, missile flight analysis, submarine guidance problems, etc.

One of the chief difficulties experienced with previous three dimensional displays was the inability to track more than one target. Another difficulty was the smallness of the display which made it hard to obtain accurate measurements. Still another problem was the inability of obtaining a permanent record.

Several attempts have been made to provide satisfactory presentation and record of data by three dimensional displays and because of the inaccurate, expensive and cumbersome memory and storage apparatus necessary therefor, no satisfactory solution was obtained.

The present invention was designed to overcome the aforesaid difficulties and it consists, briefly, of feeding data obtained from radar, Teletype, etc., into three scribing projectors and projecting a collimated beam emanating therefrom onto an oscillating screen over a map.

It is therefore a principal object of this invention to provide a three dimensional display by projecting data obtained by radar, etc., from a source in space onto an oscillating screen which oscillates over a projected map to give a viewer the effect of seeing such data as a three dimensional representation in space.

Another object is' to provide a simple, yet reliable means of presenting a three dimensional display of the position of more than one target in space.

A further object is to provide a means for recording and storing of a three dimensional display.

These and other objects and advantages of the present invention will be fully apparent from the following description when taken in connection with the annexed drawings, in which:

FIG. 1 is a somewhat diagrammatic perspective view illustrating the general layout of the three dimensional display system of this invention;

FIG. 2 is a perspective view on a larger scale, of one of the scribing slide assemblies;

FIG. 3 is a schematic diagram illustrating the manner in which the $x-t$ slide is searched; and FIG. 4 is a similar diagram showing the searching of the $3-t$ slide.

Referring to the drawings in detail, and particularly with reference to FIG. 1 wherein the elements of the entire three dimensional system of this invention is depicted, reference character 10 indicates generally a map cabinet.

A map projector 11 (which may be a projector such as a movie camera or still projector) is mounted on the floor of the map cabinet as shown.

A translucent screen 12 is mounted on the top of cabinet 10 and is horizontally disposed thereon as shown.

An oscillating screen 13 is mounted above screen 12 and disposed to move forward and backward with a reciprocating motion. The stroke being as long as the width of the translucent screen 12. Screen 13 is always normal to 12. Each end of oscillating screen 13 is connected to wheels 14 and 15. Wheel 14 is rotated by a shaft 16 driven by a motor 17 mounted on the floor of cabinet 10. Wheels 14 and 15 are above the cabinet top as shown. Wheel 15 is a mechanically coupled (not shown) idler wheel.

Oscillating screen 13 is provided with a laterally extending arm 18 and the arm 18 has a slot 19 therein for a purpose to be obvious later.

A platform 20 is disposed in front of cabinet 10 and is slidably mounted in a pair of channel runners 21 and 22.

An arm 23 attached to platform 20 extends through the slot 19 in extension 18 of oscillating screen 13 and a pulley type wheel 24 (follower) is mounted thereon and rides in slot 19. Arm 23 is attached by a connection 25 carried on top of platform 20.

A convex mirror 26 is fixed on the top of platform 20, and a plane mirror 27 is fixed in spaced relation to mirror 26 on the top of platform 20.

Three scriber slider assemblies are indicated generally by 28, 29 and 30, and one of these assemblies (which assemblies are all identical) is shown in FIG. 2 and consists of a frame 31. A pair of channel runners 32 and 33 fixed vertically to frame 31 provide a track for a slide 34 to slide in. Slide 34 is opaque.

A scriber plate 35 is fixed in a frame 36. A stylus 37 is centrally carried by plate 35. This plate is shown in FIG. 2 to be moved to the left for better view thereof. Plate 35 is also opaque with the exception of a very small area 37a around the stylus 37.

Plate 35 is movable in both vertical and horizontal directions. Frame 36 is mounted to slide on a pair of rods 38 and 39 which extend horizontally through frame 36 and in front of, and close to slide 34 as shown. Rods 38 and 39 are carried by a yoke 40. Rod 39 is threaded and is driven by a first plotting motor 41 which moves stylus 37 and its plate 35 in a horizontal direction.

A third rod 42, which is threaded is mounted in frame 31 and is driven by a second plotting motor 43.

Yoke 40, being slidable on rod 42 is driven in a vertical direction therealong.

Slide 34 may have a handle portion 44 to facilitate the insertion or removal of slide 34 in or out of channels 32 and 33. Stylus 37 is close enough to slide 34 (which is coated with an opaque substance) to etch slide 34 as it is moved by plotting motors 41 and 43. Data is fed into plotting motors 41 and 43 through a system of cables 45 leading from a source such as radar, Teletype, etc., not shown.

Three light sources 46, 47 and 48 are positioned behind scribing assemblies 28, 29 and 30. Light source 47 is the light control for the system and is the projecting light for oscillating screen 13 and this is the only light that is projected thereon.

Means for turning light 47 on and off intermittently is provided and consists of a battery of photocells 49 and a selector shield 50 which has a slit 51. This slit is .001″ to .003″ wide. The shield is intended to "read" slide 34 and must travel across and back in front of slide 34.

The horizontal coordinate of the slide 28 is the X coordinate. It is a scaled down version of corresponding X coordinate of the map on the translucent screen 12. The X dimension of the slide is a scaled down version of the X dimension on the map on the translucent screen 12.

The screen 13 and the slit 51 are in exact mechanically coupled synchronism over their respective X coordinates. If screen 13 is at one end of its X coordinate of map (on screen 12), the slit 51 is at the same end of its X coordinate on slide 28.

Any time light shows through slit 51 (at any X coordinate), it indicates the screen 13 should receive a signal at the same X coordinate. With no light through slit 51, the screen 13 does not receive light.

The action of slit 51 and its slide 28 is to turn "off" and "on" the projection beam which strikes screen 13 the instant it (13) is located at the proper X coordinate of the map (which is projected on translucent screen 12). This is a repetitive operation and will occur 20 times a second. The beam which strikes screen 13 is formed from light 47 passing through slide 29, slit 65, mirror 59a, lens 60, etc.

A second battery of photocells 56 are provided to correct a beam emanating from slide 34a, which as before stated, is the only light beam projected on screen 13. This is done by a quick response galvanometer 57 connected electrically to photocells 56 by cable 58. A shaft 59 rotated by galvanometer 57 has a mirror, or prism 57a fixed thereon.

A collimating lens 60 and focusing lens 60a are interposed between mirror 27 and slide 34a.

Since it is intended that a single dot of light is to be projected on oscillating screen 13, only a narrow slit of light is to be projected on slides 34–34b.

One means to accomplish the aforesaid, may be by masks 61, 62 and 63 having narrow slits 64, 65 and 66 respectively therein. These masks may be rotated by motors 67, 68 and 69 respectively to permit a narrow slit of light to sweep the slides 34–34b from bottom to top and from top to bottom. These motors will be synchronized with selector shield 50 through a system of cables 70.

Motor 53 of selector shield 50 is synchronized with oscillating screen 13 through a cable 71 to motor 17.

The entire system is synchronized, either electrically or mechanically. The oscillating screen 13 is oscillated back and forth over the translucent screen 12 as well as laterally back and forth by wheels 14 and 15 (wheels 14 and 15 drive and support screen 13). The mirror platform 20 oscillates only back and forth by arm 23 in a direction normal to oscillating screen 13.

The screen 13 is synchronized through cable 71 with selector shield 50.

Selector shield 50 (slit 51) turns light 47 "off" or "on" through cable 55. Light source 46 is independent of the system and may be turned on manually.

Other means for the synchronous operation of the system may be used and the means shown are by way of example only. All synchronizing means could be by mechanical connections for instance.

*Operation*

The present system uses $x$, $y$ and $z$ coordinate information to produce the illusion of a spot in space on a screen. Since all the projections are plotted against time ($z$-coordinate), slide 34 will be called the $x$–$t$ slide, 34a the $y$–$t$ slide and 34b the $z$–$t$ slide.

A map slide (not shown) is projected in relief by projector 11 on luminescent screen 12. Oscillating screen 13 is oscillated back and forth as well as left to right by wheels 14 and 15. Platform 20 will move back and forth only in a direction normal to screen 13 by action of the arm 23 and its roller 24.

Data being fed into the system is divided to flow to the three pairs of plotting motors 41 and 43 which cause the slides 34, 34a and 34b to be etched by its respective stylus 37. This etching is approximately .001 inch wide, not more than .002 inch.

The only light that will be projected onto oscillating screen 13 will be through slide 34a, whereby it will be projected through slit 65 in mask 62 through a scribe mark on slide 34a, through collimating lens 60, onto plane mirror 27, reflected to convex mirror 26 then reflected on oscillating screen 13.

Since the platform is physically a part of the oscillating screen 13, it moves therewith as one unit. Mirrors 26 and 27 are fixed on platform 20 and move therewith and the mirrors do not change their position with respect to the oscillating screen.

The beam of light which is collimated by lens 60 changes in length with the movement of screen 13.

Since masks 61, 62 and 63 are synchronized to move relative to screen 13, they cause the narrow light beam to sweep and search slides 34, 34a and 34b from the bottom to the top of the slides when screen 13 moves from left to right. When screen 13 reverses and moves right to left, masks 61, 62, 63 cause the light beam to also reverse and search from top to bottom.

Since the projection of a dot on the moving screen 13 is to be intermittent to produce a stroboscopic effect, light 47 is required to be turned off and on. The light passing through the trace made by stylus 37 on slide 34 will time the beam projected on screen 13 when it is in the exact position required. The light beam passing through this slide turns on light 47 once during each instant screen 13 is positioned properly (which could happen each time screen 13 moves a fraction of an inch). This is caused by the selector shield 50 which is in synchronization with screen 13 and will travel from left to right to "sweep" slide 34. When light is admitted through slit 51 it will impinge on photocells 49 (slide reader) which turns on light 47. When no light is admitted through slit 51, light 47 is turned off.

Means are provided to correct the beam from slide 34a with respect to height on screen 13.

The light beam through 34b slide strikes photocells 56 on one side (slide reader) to cause galvanometer 57 to be energized to turn mirror 57a an amount necessary to deflect the light beam from slide 34a higher on screen 13. If struck at the other side, the light beam is lowered on screen 13.

Hence, the beam projected on screen 13 is not a steady beam, but an interrupted or "chopped" one at a rapid rate.

The oscillation of the screen 13 which is 20 cycles per second and oscillation, also 20 cycles per second, of the mirror platform 20 together with the intermittent turning on and off of the projected light beam produces a stroboscopic effect and gives a viewer thereof the illusion of a spot of light seemingly "floating" in space over the map.

The manner in which the $x$–$t$ slide is searched is depicted graphically in FIG. 3.

The position of the oscillating screen 13 controls the position of selector shield 50. The oscillating screen moves forward and backward and laterally over the map projection 12 which has $x$ and $y$ coordinates. The positions of screen 13 will be $x_1$ and $x_2$ (see FIG. 1).

When the screen 13 is at $x_1$ over the map projection 12, the selector shield 50 will permit only $x_1$ light beams from the $x$–$t$ slide to shine on the photocells. When the oscillator screen 13 moves to position $x_2$, shield 50 permits only position $x_2$ light beams to shine on the photocells.

A light beam from the $x$–$t$ slide shining on its photocell slide reader 49 will cause light 47 to project light. If no $x$ coordinate is found to match the $x$ coordinate of the oscillating screen, no projection occurs.

In FIG. 4, the manner in which the search of $z$–$t$ slide is made is graphically depicted.

A source of light in back of slide $y$–$t$ will cause a narrow beam of light to pass through a scribed line thereon. The slide $y$–$t$ is so oriented that, without interference, a beam will fall on the correct $y$ coordinate on screen 13. However, it will not fall on the proper $z$ coordinate without additional correction. This correction is supplied by the high speed optical galvanometer 57. At each value of $y$, the mirror is deflected a sufficient amount to place the beam on the proper $z$ coordinate. The information for the z coordinate setting comes from the z–t slide. The z–t slide is searched in time phase with the y–t slide so that each value of y is matched to its proper z coordinate.

Light penetrates the opaque slides only where the slit of light crosses the scribed marks.

Before any data is received in the system, all plotting styluses are at $y=o$, $x=o$, $z=o$ and $t=o$.

When plotting starts, each coordinate $(x, y, z)$ is plotted against time $(t)$.

By using scribed projections, the need for expensive auxiliary storage and memory equipment is eliminated.

Since any scribed trace is a form of data storage, the slides can be stored for future use and the slides can be replaced automatically or manually at the proper instant.

While only a preferred form of the invention has been shown and described, other forms of the invention are contemplated and numerous changes and modifications may be made therein without departing from the spirit of the invention as set forth in the appended claims.

What is claimed is:

1. A three dimensional display for presenting an object in space as a spot on a screen comprising, in combination, first, second and third scribing assemblies responsive to incoming data, a map cabinet having a horizontal top arranged in spaced relation in front of said scribing assemblies, a map projection on said horizontal top, a screen disposed vertically over said map projection, means carried by said map cabinet and connected to said screen adapted to oscillate said screen forward, backward and laterally over said map, a source of illumination arranged behind each said scribing assembly, a reflecting means moving in synchronism with said screen and disposed between said map cabinet and said scribing assemblies, a first searching means arranged in front of said first scribing assembly and in synchronism with said screen and responsive to a light beam passing through a scribed mark on said first assembly to light said illuminating means behind said second and third scribbing assemblies, a second searching means disposed in front of said third scribing assembly for collimating a light beam passing through a scribed mark on said second assembly and onto said reflecting means and said screen, and means synchronized with said screen and arranged in front of each illuminating source adapted to cause a narrow slit of light emanating from said illuminating means behind each scribing assembly whereby scribed marks on said scribing assemblies from said incoming data will be searched for a scribed mark thereon and a scribed mark on said middle scribing assembly to be projected onto said screen intermittently to produce a stroboscopic effect thereon.

2. A three dimensional display as set forth in claim 1 wherein each said scribing assembly comprises a frame, an opaque slide slidable vertically in said frame, a plate mounted for horizontal and vertical travel in front of said slide, a cutting stylus fixed centrally in said plate and adapted to etch said slide upon said horizontal and vertical movement of said plate, a first plotting motor responsive to incoming data for moving said plate in said horizontal movement and a second plotting motor responsive to incoming data for moving said plate in said vertical movement whereby said stylus will etch said slide with respect to the data received.

3. A three dimensional display as set forth in claim 1 wherein said map cabinet comprises a structure having a horizontal top, a translucent screen fixed in said top and a map projector in said structure and adapted to project a map onto said translucent screen.

4. A three dimensional display as set forth in claim 1 wherein said means for oscillating said vertically disposed screen over said map comprises a motor in said cabinet, a shaft driven by said motor and extending upward through said cabinet, a wheel fixed on the top of said shaft and disposed at one end below an end of said vertical screen, said wheel carried by said shaft being attached to one end of said vertical screen and an idler wheel pivoted at the other end of said vertical screen and attached thereto whereby when said motor is energized said vertical screen is oscillated backward, forward and laterally over said map.

5. A three dimensional display as set forth in claim 1 wherein said reflecting means comprises a platform slidable in a pair of channel members, said channel members receiving a side each of said platform therein, an arm pivotally connected to said platform at one of its ends thereof and slidably connected to one end of said oscillating screen at its free end, said platform being disposed normal to and in spaced relation in front of said cabinet and adapted to oscillate in a forward and backward direction with respect thereto, a convex mirror fixed on said platform and a plane mirror fixed on said platform and spaced from said convex mirror whereby a light beam projected from said second scribing assembly is reflected by said plane mirror and onto said convex mirror to be reflected in turn onto said oscillating screen, said convex and said plane mirrors being constantly at a fixed distance with respect to said oscillating screen.

6. A three dimensional display as set forth in claim 1 wherein said first searching means comprises a shield having a vertical slit therein and mounted to travel from side to side in front of said first scribing assembly, a battery of photocells disposed in front of said shield, said shield being synchronized for movement with said oscillating screen, and said battery of photocells being electrically connected with said sources of illumination, whereby said shield will permit a beam of light from a scribed mark on said first scribing assembly to impinge on said battery of photocells whereby said photocells will energize said illuminating means behind said second and third scribing assemblies.

7. A three dimensional display as set forth in claim 1 wherein said second searching means comprises a battery of photocells disposed in front of said third scribing assembly, a quick response galvanometer electrically connected to said photocells and a mirror rotated by said galvanometer and disposed in front of said second scribing assembly whereby when a light beam from said illumination source behind said third scribing assembly passes through a scribed mark on said third scribing assembly, it will impinge on said photocells to energize said galvanometer to turn said mirror and collimate said beam with respect to said oscillating screen.

8. A three dimensional display as set forth in claim 1 wherein said means for producing narrow beams of light for sweeping said scribing assemblies comprises a rotatable mask having a horizontal slit therein disposed one each in front of each said illumination sources and a motor for rotating each mask and each said motor being in synchronism with said oscillating screen whereby when said screen oscillates, each said mask will sweep each said scribing assembly from bottom to top and from top to bottom to search a scribed mark thereon.

References Cited by the Examiner

UNITED STATES PATENTS

| | | | |
|---|---|---|---|
| 2,714,199 | 7/1955 | Adams et al. | 88—24 |
| 2,854,886 | 10/1958 | Stroud | 88—24 |
| 2,859,659 | 11/1958 | Fenske et al. | 88—24 |
| 3,238,841 | 3/1966 | Bjelland et al. | 88—24 |
| 3,246,562 | 4/1966 | Cooper et al. | 88—24 |

NORTON ANSHER, *Primary Examiner.*

R. M. SHEER, *Assistant Examiner.*